Figure 1:
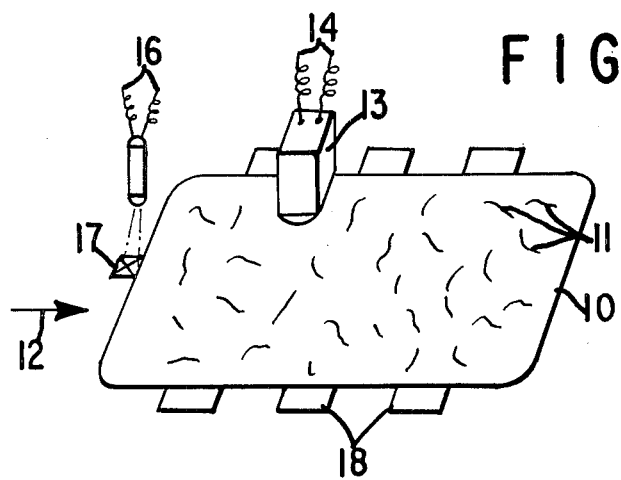

United States Patent [19]

Brosow et al.

[11] 4,218,674
[45] Aug. 19, 1980

[54] METHOD AND A SYSTEM FOR VERIFYING AUTHENTICITY SAFE AGAINST FORGERY

[75] Inventors: Jorgen Brosow, Hof, Australia; Erik Furugard, Anieres, Switzerland

[73] Assignee: Dasy Inter S.A., Geneva, Switzerland

[21] Appl. No.: 898,149

[22] Filed: Apr. 20, 1978

Related U.S. Application Data

[63] Continuation of Ser. No. 611,608, Sep. 9, 1975, abandoned.

[51] Int. Cl.² .................. G05B 1/00; G06K 7/08; G06K 5/00; G11B 5/02
[52] U.S. Cl. .................. 340/149 A; 235/380; 235/493
[58] Field of Search .................. 340/149 A; 235/493, 235/487, 380

[56] References Cited

U.S. PATENT DOCUMENTS

| | | | |
|---|---|---|---|
| 3,356,602 | 1/1975 | Fayling | 340/149 A |
| 3,598,968 | 8/1971 | Victor | 235/61.11 |
| 3,636,318 | 1/1972 | Lindstrom et al. | 340/149 A |
| 3,727,187 | 4/1973 | Norwich | 340/149 A |
| 3,788,617 | 1/1974 | Barney | 235/493 |
| 3,790,754 | 2/1974 | Black et al. | 235/493 |
| 3,793,600 | 2/1974 | Grosbard | 235/487 |
| 3,808,404 | 4/1974 | Riggs | . |
| 3,873,975 | 3/1975 | Miklos et al. | 340/149 A |
| 3,878,367 | 4/1975 | Fayling et al. | . |
| 3,882,301 | 5/1975 | Nassinbene | . |
| 3,932,731 | 1/1976 | Moore, Jr. | . |
| 4,025,760 | 5/1977 | Trenkamp | 340/149 A |
| 4,114,032 | 9/1978 | Brosow et al. | 235/493 |

FOREIGN PATENT DOCUMENTS 1308331  2/1973  United Kingdom ............. 235/61.12 M

*Primary Examiner*—Donald J. Yusko
*Attorney, Agent, or Firm*—Hammond & Littell, Weissenberger and Muserlian

[57] ABSTRACT

This invention relates to a method and system for verifying authenticity safe against forgery of an object releasing a function said object being of base material having random imperfections in or on the same, comprising measuring random imperfections in or on the base material of said object in a predetermined measuring track over the surface of said object of base material having random imperfections in or on the same by means of a detector for detecting said random imperfections, said random imperfections optionally being supplied to said base material, converting said measured random imperfections into pulses, supplying said pulses together with timing pulses to an AND gate, whereby only simultaneously arriving pulses are passed, supplying said passed pulses to a shift register shifting with said timing pulses to obtain a binary code, comparing said binary code with a previously stored binary code of the same object, whereby the function is released if said binary codes are identical; as well as a system for carrying out the method.

6 Claims, 17 Drawing Figures

METHOD AND A SYSTEM FOR VERIFYING AUTHENTICITY SAFE AGAINST FORGERY

This is a continuation of Ser. No. 611,608, filed Sept. 9, 1975, and now abandoned.

THE PRIOR ART

Different types of provisions for legitimacy for physical or juridical persons require differentiated proof of legitimacy. Such a proof of legitimacy, for instance may be a document such as a passport, an identity card or the like. For other functions of legitimacy, check cards, credit cards, or the like, are used. For certain purposes, for instance, a driver's licence or identity cards issued by enterprises for their employees may be involved. Such identity documents usually are provided with the holder's name and other personal details. Moreover, they may be provided with the holder's photograph and signature.

If, for the provisions of legitimacy, a single document of this kind is sufficient, forgery usually can easily be made. Even if for increasing the safety against forgery additional, for instance, optically invisible and coded statements are included in the document of legitimacy, forgery is easily possible, because in the case of theft of a valid document of legitimacy, alterations of the photograph or the signature may not absolutely be excluded or even may not be required. For this reason, often several documents are used for different functions, which in combination only will effect sufficient legitimacy for performance of the desired function. Thus, in the monetary trade, checks and check cards are used, or for crossing borders, passports and visas are employed, which only in combination will release the desired function. The safety against illegitimacy is thus increased, but it is still difficult and in some cases quite impossible to verify whether a document of legitimacy is used by the real holder and within the respective fields authorized by said legitimacy.

Thus, for instance, there is a need, in a more safe way than was hitherto possible, to exercise control of credit cards and money transactions connected therewith, for instance that the credit card in not forged or is illegally used by another person than the real holder, or that the function, i.e., in this case the limit of the credit authorized by the card, in not exceeded. Another object desirable in this connection is that it should be easier to follow up each transaction involved, irrespective of whether they are carried through manually or automatically.

For meeting this need, a great number of systems are already known ("Electronics", Mar. 29, 1971, pages 42 to 48) which facilitate the cashless trade in different ways. As described therein, verifying terminals are provided which perform certain controls. These controls, for instance, may consist in that bits of information about the maximum credit, as stored on magnetic strips in the credit card, possibly in code form, are compared with the claimed sum, that, in accordance with the result of the comparison, either the credit is refused or the claimed amount is delivered, and that possibly the coded statement on the magnetic strip is altered accordingly. Other verifying terminals are connected through the public telephone network or by other means with central computers which check the number of the credit card and the number of the account, determine the state of the account and release the amount claimed by means of the credit card in the case of the existance of the proper conditions. All of these systems have a relatively low safety against illegitimate use by persons other than the legal holder of the document.

Therefore, various methods are known by which the safety against forgery of legitimacy documents is increased. Thus, for slot-paying mechanisms, a method is known (German Published Application DOS No. 2,119,491) wherein, for enchancing the safety of machine-readable check cards and machine-readable checks, a so-called validity code must be provided at a determined place on the check by the holder in order to make it valid. This code is then verified in a testing device concurrently with the verification of the check card and the check for issuing the special check required for the operation of the slot-paying mechanism. The special check will be delivered only if the validity code is placed on the check in the correct way. The drawback of this method consists in that the check card, the check and the validity code on the check have to be controlled. Moreover, an improvement of safety can only be achieved with slot-paying mechanism. In the normal monetary trade with bank offices, absolute safety does not presently exist as before, because possibly even with a check provided with the validity code without simultaneous presentation of the check card, the payment at the counter of the bank office would be carried through, since all bits of information required for payment appears on the check. It has been found in practice that such payments in bank offices, which, indeed, are not in accordance with the existing system of safeguards are often carried through with known customers and result in an additional reduction of safety in the check trade. The same also relates to credit cards or the like.

Moreover, a demand exists for a method for subsequently verifying the legitimacy of objects of art such as paintings or to verify the legitimacy of access of unknown individuals to areas of secret activities.

OBJECTS OF THE INVENTION

An object of the present invention is to provide a system for improvement of the safety in transactions with documents of legitimacy by a control of legitimacy safe against forgery and the necesary apparatus.

Another object of the present invention is to provide a method for verifying the authenticity safe against forgery of an object releasing a function, said object having random imperfections capable of being detected in or on the base material of said object, which comprises the steps of detecting the amount of said random imperfections in a predetermined measuring track over the surface of said object of base material having random imperfections in or on the same, converting said detected random imperfections into pulses, coordinating said detected pulses with time pulses, supplying said coordinated pulses in the form of a binary code, and comparing said binary code with a binary code previously ascertained by the above steps and stored, whereby said function is released if the said binary codes are identical.

A further object of the present invention is the development of a system for verifying the authenticity safe against forgery of an object releasing a function, said system comprising 1. An object releasing a function having random imperfections capable of being detected in or on the base material of said object 2. means for detecting the amount of said random imperfections in a predetermined measuring track over the surface of said object of base material having random imperfections in or on the same,
3. means to convert said detected random imperfections into pulses,
4. a timing means supplying timing pulses
5. means to coordinate said detected pulses and said timing pulses in the form of a binary code,
6. means to compare said binary code with a binary code previously ascertained and stored for verification, and
7. means for releasing said function upon verification.

These and other objects of the invention will become more apparent as the description thereof proceeds.

THE DRAWINGS

Figure 2:
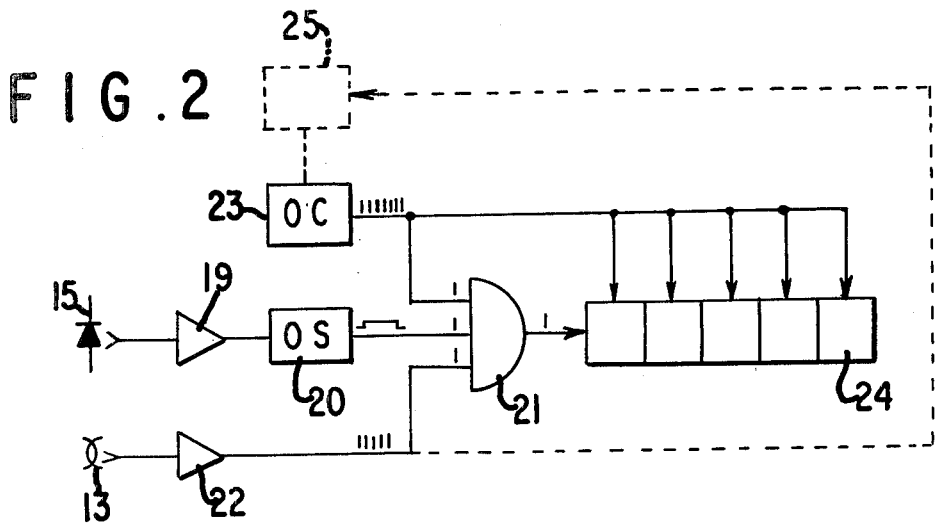
Figure 3:
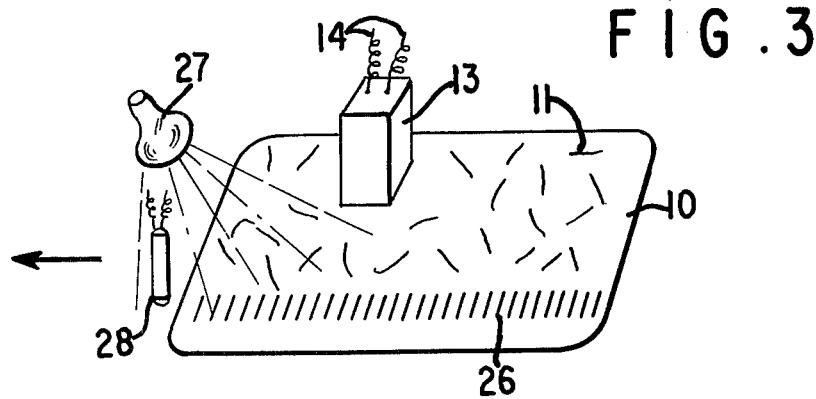
Figure 4:
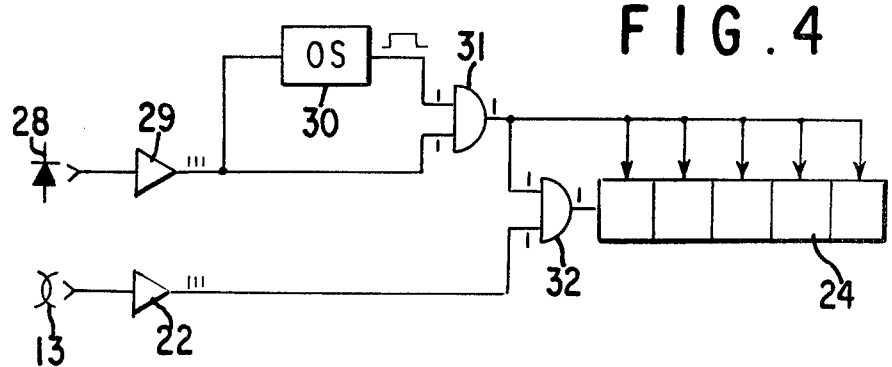
Figure 5:
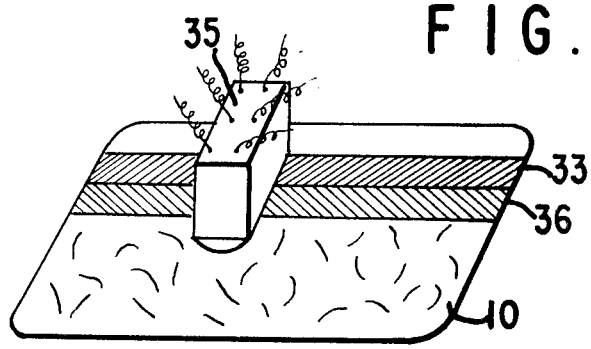
Figure 6:
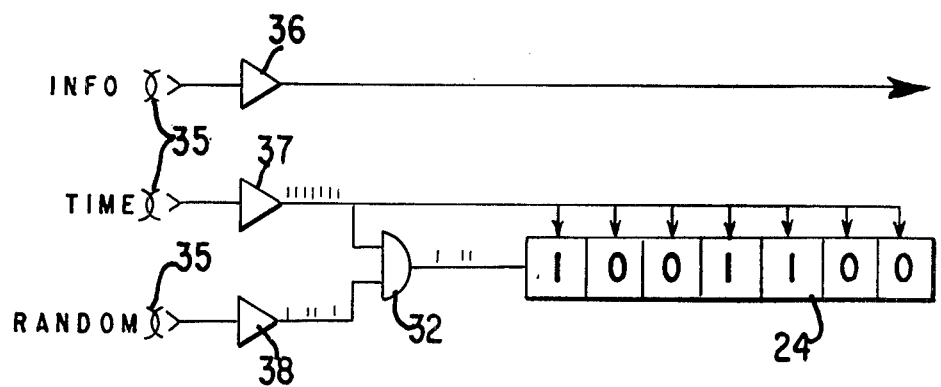
Figure 7A:
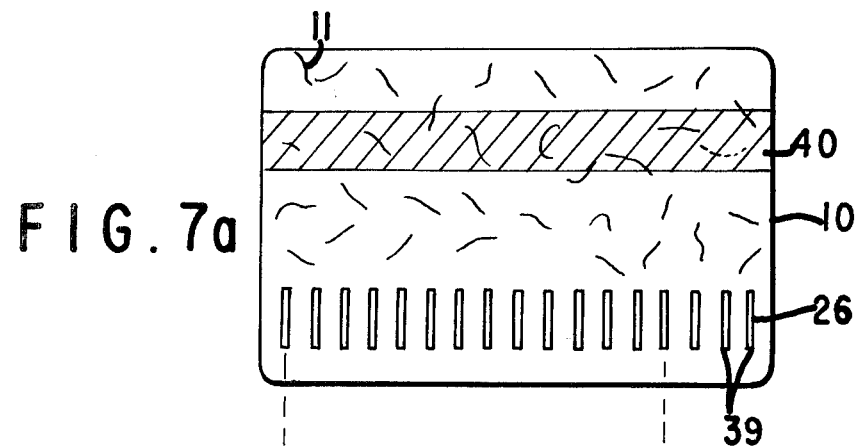
Figure 7B:
Figure 7C:
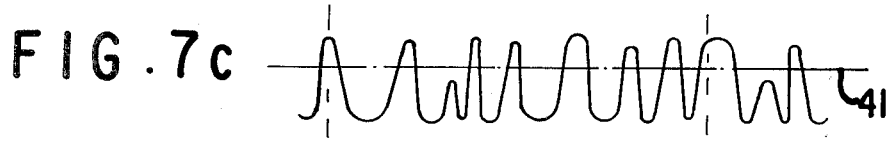
Figure 7D:
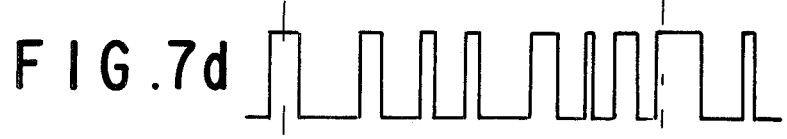
Figure 7E:
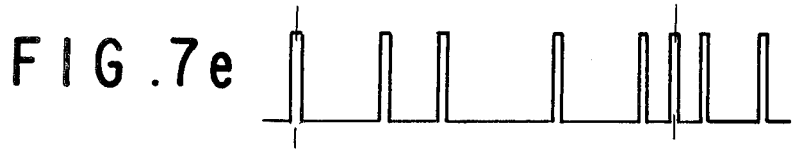
Figure 7F:
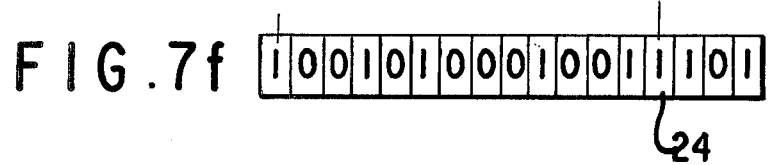
Figure 8:
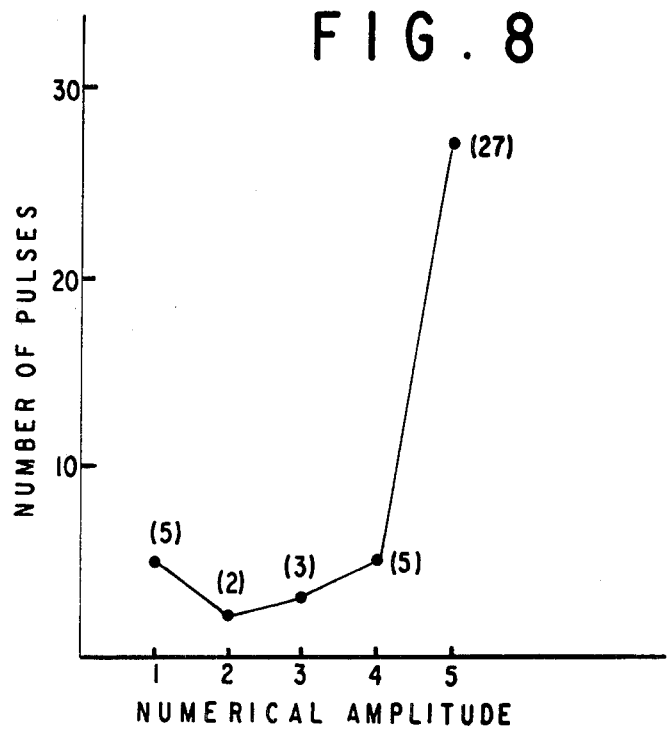
Figure 9:
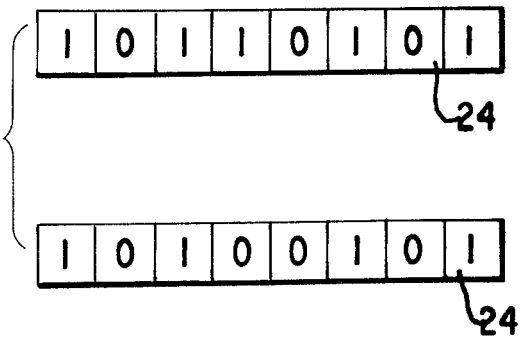
Figure 10:
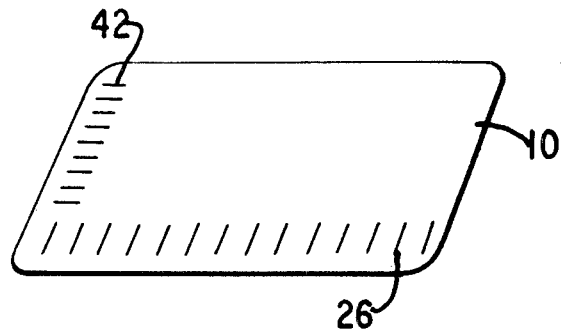
Figure 11:
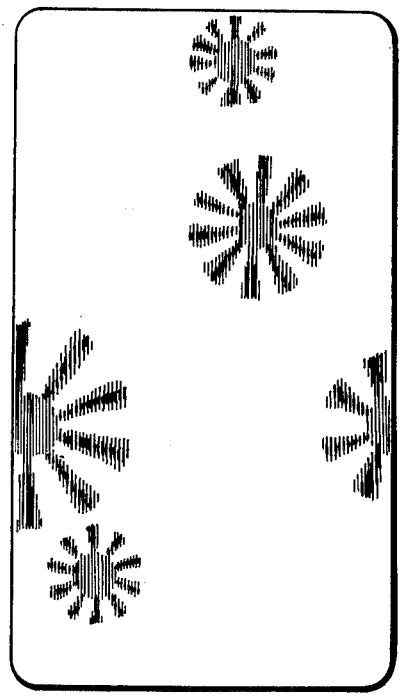
Figure 12:
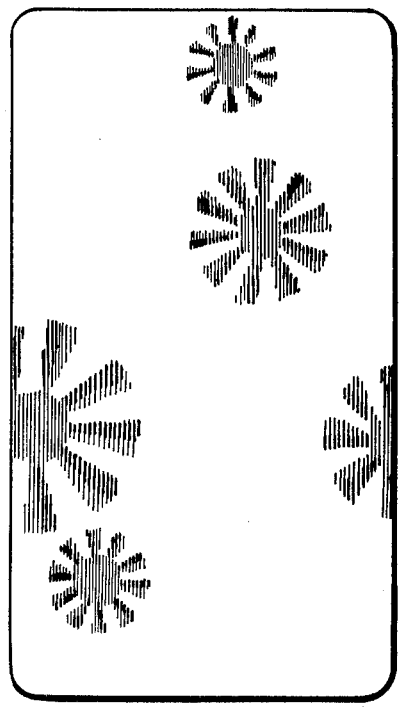

FIG. 1 is a perspective view of an arrangement for verifying the authenticity of a document without a timing track, FIG. 2 is a schematic view of a circuitry of a device for verifying the authenticity in the system according to FIG. 1, FIG. 3 is a view corresponding to FIG. 1 comprising a document equipped with a timing track in the form of visible marks, FIG. 4 is a view corresponding to FIG. 2 of the respective circuit, FIG. 5 is a view corresponding to FIG. 1 of an embodiment with a magnetic timing track and a magnetic information track provided on the document, FIG. 6 is a view similar to FIG. 2 of the circuitry of the embodiment according to FIG. 5, FIGS. 7a to 7f show the concrete case of ascertaining an identification code in the case of the embodiment corresponding to FIGS. 3 and 4, FIG. 8 is a diagram showing that the identification code can reliably be reproduced, FIG. 9 is a schematical view explaining how to consider for evaluation the result obtained according to FIG. 8, FIG. 10 is a view of another embodiment, FIG. 11 is a view of a document having lines printed at different levels and a ribbed surface, and FIG. 12 is a view of the documentary of FIG. 11 at an angle showing the optical illusion of relative movement of the printing.

DESCRIPTION OF THE INVENTION

The above objects have been solved in the present invention in that in any case the identical scanning track is scanned from a fixed initial point, that to the continuous scanning of the scanning track through the detector a timing means is coordinated, that whenever there is timely coincidence between a timing pulse from the timing means and an output pulse from the detector, said output pulse is fed to a register, and in that the random arrangement of the scanned particles in the scanning track relative to the initial point is simulated in said register.

More particularly, the present invention relates to a method for verifying the authenticity safe against forgery of an object releasing a function, said object having random imperfections capable of being detected in or on the base material of said object which comprises the steps of detecting the amount of said random imperfections in a predetermined measuring track over the surface of said object of base material having random imperfections in or on the same, converting said detected random imperfections into pulses coordinating said detected pulses with time pulses, supplying said coordinated pulses in the form of a binary code, and comparing said binary code with a binary code previously ascertained by the above steps and stored, whereby said function is released if said binary codes are identical; as well as a system for verifying the authenticity safe against forgery of an object releasing a function, said system comprising 1. an object releasing a function having random imperfections capable of being detected in or on the base material of said object
2. means for detecting the amount of said random imperfection in a predetermined measuring track over the surface of said object of base material having random imperfections in or on the same,
3. means to convert said detected random imperfections into pulses
4. a timing means supplying timing pulses,
5. means to coordinate said detected pulses and said timing pulses in the form of a binary code,
6. means to compare said binary code with a binary code previously ascertained and stored for verification, and
7. means for releasing said function upon verification.

The objects releasing a function having random imperfections capable of being detected in or on the base material of said object can be the most widely varied. Ordinarily, they are some type of document, however, they can be an object of art, such as a painting for which a subsequent verification is required, or even a portion of the anatomy of a person who needs verification such as for entrance in an area under security. The random imperfections in or on the base material of the object is any random or uncontrolled small defects or imperfections present which can be detected and counted. These may be ordinarily formed during the manufacturing process of the object or they may be added to the object during or subsequent to the manufacturing of the object. The essential thing is that the defects or imperfections must be randomly or uncontrollably present and occupy a small amount of the surface of the object, preferably less than 5% of the surface area. The amount of imperfections, however, should be substantial and at least 20 should be present in the predetermined track to be detected.

These random imperfections, as indicated, may be those normally occurring during the manufacture of the object releasing a function, such as the magnetic holes in magnetic strips used in credit cards or magnetic tape, wood slivers present in paper, etc. The random imperfections can be added during the manufacture of the object releasing a function, such as particles capable of being measured, added to a paper batch or a plastic batch before the object is formed. Finally, the random imperfections can be added to the surface of the object after the same is completed, such as a sprayable binder composition containing finely dispersed particles capable of being measured or a random etching of the surface of the object.

Preferably the object releasing a function is some type of document. Where a document is concerned, a plurality of different objects may come into question, but the invention is particularly suitable for securing the identity of passports, driving-licenses, credit cards and the like. Such documents are made of paper, plastic or another material adapted for the production of documents. This determines the base material to be used for the manufacture of the document. To this base material particles are added, the physical properties of which differ from those of the base material. To this end e.g. particles may be used, the reflection coefficient of which differs from that of the base material surface, or particles having fluorescent properties, or particles whose color or transparency differs from that of the base material, or particles having electric or magnetic properties deviating from those of the base material.

The particles may be fibers of a magnetic or magnetizable material and the surface of the document is coated with such material, or the fibers are added to the base material. Documents having different properties can be classified in the light of the fiber charge. In this way it is possible e.g. to distinguish from each other paper money of different worth, credit cards with different withdrawal limits, driving-licenses for different classes or motor vehicle permits for truck, motor-cars, etc. To this end the aforementioned measures are taken and in the evaluating circuit the particles scanned by the detector in the scanning track are counted. If the counting result is within a predetermined limit the documents are authentical. If not so, it is forged.

On principle it would be desirable to develop this way of verifying the authenticity in such a way that not only the documents can be classified, but that also each individual document can be verified by means of a counting operation. Besides, if e.g. for a 100 million people ($10^8$ persons) a predetermined type of document would have to be verified with regard to identity, a counting operation could no longer guarantee safe distinction. And, after all, it would be impossible to accommodate the information on relatively small documents. Moreover, frequent identification errors would be inavoidable.

Therefore, it is the object of the invention to provide a method and device for verifying the authenticity of objects by means of random imperfections which are incorporated into a base material and have physical properties other than said base material in order to ensure identification of individual documents like individual persons are identified by their finger-prints.

In the present invention this random arrangement of the scanned particles is evaluated as an identification code. As a result the authenticity of a specific object or document is safeguarded by the accidental properties of the particles it is charged with. Thus, forgery is practically excluded. In this context it is to be implied that the individual random information of the document—when being made out is stored in the form of its identification code by means of a central computer. If such a document is lost before being made out or is stolen, the identification code appertaining to said document is not stored in the central computer. In this case, too, such a document which, regarding all the other data thereon, appears completely genuine, is recognized as a document which has not yet been made out (blank) or has been forged. If the document is stolen after having been issued, i.e. after the document and the appertaining random information for identification thereof has been stored already in the central computer, forgery is impossible if only because in the case of a changing of the imprinted information, of the picture, of the plastic wrapper or of whatever detail, in any case the random information serving for identification is changed, too. If just one out of the tiny particles randomly present, is broken off or is multiplied or slightly displaced, the random information serving for identification purposes is changed and the document can be identified as having been forged. This is independent upon which base material the particles are added to. It may be the support material of the document, the photo-emulsion of the photography attached to the document, or the printing ink for the imprint. As for the document it would be possible to embed the particles into the mass or into the surface layers. However, security against forgery is achieved not only by storing the random information in a central computer, but also offline, if additional measures are taken as e.g. throughly described in the U.S. Pat. No. 3,859,508.

From the above statements it may be seen that it is of decisive importance to no longer use a mere counting operation, but to fix instead precisely the positions of said particles relative to a co-ordinate system. The abscissa of this co-ordinate system is formed by the timing means, such as a timing pulse generator or a timing track. Since it is only when a timing pulse from the timing pulse generator coincides with an output pulse from the detector that the output pulse thereof is fed to a register, a highly precise diagram is obtained. Moreover, since in one and the same scanning track always the same predetermined initial point is used it is safeguarded that said diagram is precisely the same whenever the scanning operation is repeated. Laterally the ever constant scanning track is guaranteed by the well-known devices of scanning head auto-centering or by fixed stops. This ensures that, whenever the verifying operation is repeated, the same random information serving as an identification code is obtained along the predetermined track.

To this end it is of course necessary that also the timing by the timing pulse generator is identically retained. This can be achieved by incorporating the timing control into the document itself, such as by marks which are applied to the documents as a timing track and which may be of optical or magnetical nature. The more sophisticated the scanning operation by means of the timing control, the more different identification codes are obtained over a predetermined length of the scanning track and the more impossible becomes forgery. In the case of a 2" scanning track, 128 juxtaposed scanning points can be provided along the scanning track. If just half of this number were possible, on principle each individual person of a population of 500 million people could be given an identity document which is fully different from any other document owing to its random information included in a predetermined scanning track.

The random information serving as an identification code is typical, just like a person's finger-prints. They have in common that casual factors are used as an identification code, which cannot artificially be imitated because they have been formed accidentally. However, they can easily be checked. In both cases checking in a co-ordinate system is possible. To this end the accidental arrangement of the scanned particles is simulated in a register, on the model of a fixed initial point. Said simulated pattern is always the same and therefore, it can actually be used for determining the identity. Moreover, in these days it can be realized easily in terms of technology.

In addition, the scanned track can be offset slightly to the left and to the right for a new determination of the identification code if the first scan gives an indication of forgery. This is necessary since, with use, some wear occurs along the edges of the object releasing a function and the object may be slightly off center between the fixed stops of the scanning device. This can be accomplished automatically as is well known.

In the following, the drawings are explained in the light of simplified exemplifying embodiments as represented in the figures.

The following description is referred to a document 10 which has approximately the size of a credit card, but in fact is an identification document, a driver license or the like. Said document 10 may consist of paper, plastic, etc. Possibly it is enclosed in a plastic wrapper. Either the document 10 itself or a surface layer of said document, a photography, an imprint, etc., consists of a base material charged with random imperfections, preferably measurable particles. In the subject example it is implied that the document 10 consists of a base material comprising particles 11 (magnetic fibers) as indicated in FIG. 1. The positions of said particles 11 in the base material of the document 10 are completely casual, practically cannot be controlled and are determined automatically during manufacture. Therefore, the accidental position and the distribution of the particles 11 cannot be imitated and the distribution in each individual document 10 is a typical as each person's fingerprints are individual and typical. The production of such a document is described in our copending U.S. Patent Application Ser. No. 469,625, filed May 13, 1974 now abandoned.

FIG. 1 shows the document 10 comprising embedded particles 11, which is moved in the direction of an arrow 12 underneath a stationary magnetic head 13, so that by moving the document 10 relative to the magnetic head 13 a scanning track is formed. It is only said relative movement which is of importance and which of course can be obtained also by moving said magnetic head 13 relative to said document 10. Complicate scanning track designs can be achieved by simultaneously moving the document 10 and the magnetic head 13. The relative motions can either be in straight lines or rotational lines. The magnetic head 13 is provided with leads 14. The path of movement of said document 10 additionally includes a light-emitting diode 15 comprising leads 16 and a lamp 17 located opposite to said diode on the other side of said path of movement. When being moved in the direction of the arrow 12 the document 10 is precisely guided sidewise by abutments 18 to safeguard that the magnetic head 13 will always identically scan the same scanning track of the document 10. Instead of said guidance by means of abutments 18 it is possible to provide for auto-centering of the magnetic head 13 to said scanning track, in that a mark is applied to the document 10. In any case, provision must be made for the magnetic head to always scan the same scanning track.

FIG. 2 shows the circuit for evaluating the identification code read out, which results from scanning of the scanning track. When the document 10 is moved in the direction of the arrow 12 in FIG. 1, its rear edge finally leaves the area between said lamp 17 and said photodiode 15. Said photodiode 15 is consequently irradiated by said lamp 17 to deliver current which is amplified in an amplifier 19 and applied to a monoflop 20 (OS=one shot). The latter generates a gate pulse for an AND gate 21 to initiate evaluation. The particles 12 scanned by the magnetic head 13 generate corresponding signals which are applied to another input of said AND gate 21 via an amplifier 22. A third input of said AND gate 21 finally is connected to an oscillator 23 delivering a repetition of fixed frequency timing pulses.

Said AND gate 21 delivers an output pulse only when a pulse appears simultaneously at all of said three input leads. Consequently the length of the effective scanning track is determined by the pulse duration of the pulse delivered by said monoflop 20. In the course of this pulse duration an output signal of the AND gate 21 appears whenever one of said output pulses of said amplifier 22 coincides with a timing pulse from the output of said oscillator 23. Such an output signal of said AND gate 21 is fed into a shifting register 24, which, on its part, is fed with the timing pulses from said oscillator 23 as shift pulses. Said shifting register 24 comprises as many storage positions as said oscillator 23 delivers timing or shift pulses within the scanning time determined by said monoflop 20. Thus when the scanning operation is finished (said monoflop 20 takes its initial position again) the shifting register contains a binary record of a code key representing the identification code derived from the random information by the distribution of the particles 11 in the document 10 along same the scanning track.

FIG. 2, of course, is represented in a very simplified manner. In particular the various common pulse-shaping elements which are well known to those skilled in the field have been omitted. Frequently, the pulse obtained by the magnetic head 13 is subject to integration of its wave front in order to achieve distinct pulse peaks. Conveniently an amplitude separator means is included, through which only signals can pass, which have an amplitude exceeding a threshold value. In this way errors are excluded.

In FIG. 2 a counter 25 is indicated by a dashed line. It is possible namely to subject the output signals obtained by the magnetic head 13 to a counting operation. The scanning track being known, it is possible by this counting operation to ascertain the number of particles 11 per areal unit of the document 10 this to classify the document. This provides for additional security, since such documents are recognized as genuine only which comply with certain classification conditions. It is possible e.g. to use different particle densities for drive licenses and identity documents. It is also possible to distinguish between driver licenses issued for various classes. Apart from the function of classification the counter 25 has still another function. Advantageously the fineness of the time pattern by the timing pulses from the oscillator 23 can of course be adjusted to the density of particles in the document 10. This is possible e.g. in that the counter 25, in accordance with the result of the classification carried out, adjusts the oscillator 23 to an oscillation frequency which corresponds to the density of particles.

For the rest it is possible to advance the document by means of a step motor or a sync motor controlled by the basic frequency of the oscillator 23.

The evaluation circuit represented in FIG. 2 can be used isolated in an off-line terminal. Then the identification code possibly must be provided on the document in a coded form. As an example, the binary storage contents of the shifting register is read out and imprinted as a decimal. Said decimal can be coded easily by using a storage position key, so that the first storage position is rated as $2^0$, the second as $2^2$, the third as $2^1$, etc. There are innumerable possibilities. Ascertaining said decimals also facilitates control by the off-line staff. It is particularly effective when the output signal of the AND gate 21 is fed to a modem connected to a central computer where the document identification code resulting from the random information is stored.

In the embodiment according to FIG. 2 the timing pulse generator is incorporated into the device. However, it is possible and frequently convenient to place the timing pulse generator on the document 10 itself.

The oscillator 23 can be replaced by a device which measures the time elapsing between the generated signals and passes to the shift register only those generated signals which occur within a standard elapsed time, such as 4 milliseconds.

FIG. 3 shows an embodiment according to which the document 10 is provided with a timing track of 26 consisting marks applied at regular spacings. In the example the marks are made of a fluorescent material. The marks 26 are illuminated by a lamp 27 and scanned by a photodiode 23.

FIG. 4 shows the coordinated evaluating circuit. To the output of the photodiode 28 an amplifier 29 is connected, at the output of which the fixed frequency pulse repetition can be disposed of, which is generated by the marks of the timing track 26. Said pulse repetition is applied, on the one hand, to a monoflop 30 which on its part determines the scanning length and, on the other hand, to an AND gate 31, the second input of which is fed by the output signal of the monoflop 30. Thus, the pulse repetition generated by the photodiode 28 through scanning the marks of the timing track 26 appears at the output of the AND gate 31 as long as there is an output signal of the monoflop 30. The output signals of the AND gate 31 again serve a double purpose; firstly as shifting pulses for the shifting register 24 and secondly as timing pulses for the control of the scanning. As such they are applied to an input of an AND gate 32, the other input of which is fed, via an amplifier 22, with the pulses obtained by scanning the particles 11 contained in the document 10 by the magnetic head 13. The AND gate 32 delivers a pulse to the shifting register 24 when at one of the inputs thereof an output signal from the amplifier 22 coincides with a timing pulse at the other input thereof. Thus also in this case the accidental position of the particles 11 in the document 10 along the scanning track is represented by the pulses stored in the shifting register 24 as a binary code.

FIGS. 5 and 6 serve to explain another embodiment. In this example, the document 10 containing the particles 11 additionally comprises a magnetic information track 33 and a magnetic timing track 34. On the magnetic information track 33 any information can be recorded, which is to be incorporated into the document. On the magnetic timing track 34 a frequency is recorded, which has the same effect for the scanning operation as the marks provided in the timing track 26 of the FIG. 3 embodiment. In this embodiment a triple magnetic head 35 is used, which simultaneously scans the magnetic information track 33, the magnetic timing track 34 and the scanning track of the document 10 in order to ascertain the identification code thereof. The particulars are indicated in FIG. 6: to the output terminal of the triple magnetic head 35 three amplifiers 36, 37 and 38 are connected. The information from the magnetic information track 33 is further evaluated at discretion. The information from the timing track and from the scanning track is fed to the AND gate 32 in the aforementioned manner and stored in the shifting register 24 which receives the necessary shifting pulses from the timing track, also. FIG. 6 does not show a controlling means for the start and the end of the effective scanning operation. Also in this case details with regard to pulse shaping and the like are shown. In FIG. 6 the type of storage contents of the shifting register is indicated at the shifting register 24. In the following realization thereof will be explained.

FIG. 7a to 7f serve to explain how the storage contents in the shifting register 24 is being realized.

FIG. 7a shows the document 10 containing particles 11 and the timing track 26 which consists of individual marks 39 arranged side by side with predetermined spacings along the longitudinal edge of the document 10. The timing track 26 extends parallel with regard to a scanning track 40 which is hatched in FIG. 7a. Since the scanning magnetic head not only has a gap width in scanning direction, but also a certain gap length transversely relative to the scanning direction, also the scanning track 40 has certain width. The particles 11 are distributed completely casually. But by abutments or auto-centering of the magnetic head above the scanning track 40 it is safeguarded that the magnetic head always scans identically the same scanning track 40.

FIGS. 7b to 7d are represented as being spatially coordinated to the document 10. But in reality the pulse repetitions shown are a representation where the pulse amplitude serves as the ordinate and the time as the abscissa. Such a representation is obtained by moving the document 10 according to FIG. 7a towards the left-hand side past a stationary magnetic head. For facilitating comprehension, however, the spatial coordination of the individual pulses in FIGS. 7b to 7d to the conditions prevailing on the document 10 or to the positions of the shifting register 24 is stressed in that the figures are arranged one upon each other; the coordination is furthermore optically emphasized by two vertical dotted lines.

FIG. 7b shows the output signal of the amplifier 29 according to FIG. 4, which is amplified to saturation. It is the question of a fixed frequency pulse repetition, i.e. timing pulses obtained by scanning the marks 39 of the scanning track 26 by means of the photodiode 28 and the lamp 27.

FIG. 7c shows the output signal of the magnetic head 13 according to FIG. 4 in the form of an asymmetric analogous signal. There is a pulse peak whenever in the scanning track 40 a particles 11 lies beneath the magnetic head 13. The pulse amplitudes depend also upon whether the particles lie on the surface of the base material or whether they are embedded more deeply into the base material. On the outer right-hand side of FIG. 7a in the scanning track 40 of the document 10 a particle 11 is shown by a dashed line. This indicates that said particle is embedded deeply into the base mass so to cause a signal of reduced amplitude when being scanned, as can clearly be seen in FIG. 7c. Moreover, fibers which are detected by the scanning track 40 to a very small extent only will cause pulses having reduced amplitudes, as e.g. indicated in FIG. 7c at the third pulse from the left-hand side. To make the situation clear a threshold value 41 is fixed by amplitude separation provided in the amplifier 22 connected therewith and only such pulses are used for evaluation, the amplitudes of which being above said threshold value 41.

FIG. 7d shows the output signal of the amplifier 22 according to FIG. 4, which is amplified to saturation, said amplifier being a multi-stage amplifier and in the various stages amplitude inhibitation and saturation amplification is effected.

FIG. 7e shows the output of the AND gate 32, i.e. the pulses which are offered to the shifting register 24. It can be seen that such an output pulse from the AND gates 32 appears only when timing pulses according to FIG. 7b coincide with signal pulses according to FIG. 7c.

FIG. 7f shows the random information of the particles in the scanning track 40 simulated in the shifting register 24. Said representation corresponds to those of FIG. 7d. For the rest, this representation can readily be realized also in practice by using a corresponding direction of storing the information in the shifting register 24. Thus it can be seen that it is actually possible to precisely control the accidental arrangement of the particles 11 in the scanning track of the document 10. Hence follows that random information is used, a widely forgery-proof system.

FIG. 8 proves that the results obtained can actually be reproduced with a good result. The figure was drawn up on the basis of a document 10 which had forty-two particles in its scanning track 40, which upon scanning produced a pulse having a sufficient amplitude. Five scannings were made one after the other. In all of the five scannings 27 pulses according to FIG. 7d were obtained. Five pulses are covered in four scannings only, three pulses in three scannings only, two pulses in two scannings only, and five pulses finally appeared in a single scanning only. It is immediately possible to use always only those 27 pulses for the identification code, which are covered in all runs. To this end it is sufficient to each case to carry through several runs when the document is made out by an issuing terminal and to evaluate by the evaluating circuit only those pulses for the identification code, which are sure to appear in all runs. Those unsafe ones are not evaluated, which is possible by coordination to the appertaining timing pulse. By corresponding constructional details it proved that it is possible to raise the value of the pulses covered in all runs up to more than 80%, and to approximately 100% when corresponding engineering efforts are made. For the rest, it is not at all difficult to carry out several runs for evaluating purposes, because the test speed is high. To this end the terminal constructions are particularly suitable, into which the document is firmly inserted and where the detector is moved to and fro several times along the scanning track.

FIG. 9 shows in which way the results of FIG. 8 are taken into consideration for evaluation. The shifting register 24 in represented twice is superposes arrangement, with the counter readings having been taken in two different evaluation runs. It can be seen that, except for the fourth space the information fed into the shifting register is identical, which fourth position is consequently an unsafe evaluation. Said place relates to one of those pulses which do not appear in any run. This fact can be easily allowed for in that a code key provided on the document 10, which e.g. states the place where the initial point of the code track to be scanned is located, is given the additional information that the fourth storage space is not to be used for evaluation. In this way the unsecure pulses can be completely eliminated for evaluation, so that always unequivocal evaluation conditions are obtained.

FIG. 10 shows an embodiment with a still more sophisticated system. The document 10 is provided with the timing track 26 mentioned in the foregoing already. However, vertical relative to said track there is provided an additional local track 42. Said local track 42 can be used for centering the scanning head to the right track. But it is also possible e.g. to constantly change the indentity-proof of the document in such a way that in one year e.g. the second mark of the local track 42 is used for fixing the scanning track, in the next year the fifth mark and so on. Thus the identity-proof of the document is changed and in this way it can be forged with still greater difficulties only, because it is not only the information contained in a single scanning track, but that of numerous scanning tracks throughout the document 10, that would have to be simulated. That which is practically impossible for a single scanning track can never be realized when there are numerous scanning tracks. However, it is extremely uninteresting to forge a document for a short period only. Moreover, by means of the local track 42 and the marks provided therein at the same time several mutually parallel scanning tracks can be scanned and stored by a single scanning movement of a magnetic head 13. In that way the number of information obtained through a relative movement between the magnetic head 13 and the document 10 over a certain length is multiplied, so that the system becomes even more secure.

The timing track 26 and the local track 42 supplement each other to form a complete coordinate system.

FIGS. 11 and 12 show another embodiment of the document 10 comprising a lenticular viewing screen having on its front face a series of very fine contiguous parallel convolutions constituting segments of optical cylinders forming lens elements, and a print or picture sheet disposed at the back of said screen in face to face contact therewith as to be exposed or displayed therethrough and containing at least two alternate series of parallel complemental image lines parallel to the lens element of the screen, each series constituting a linear dissection of a master picture, object or subject and compositely defining a lineiform design or picture. The two series of image lines are be so optically related with respect to the lens elements of viewing screen as to be separately and successively visible as coherent pictures upon positional change of said screen with respect to the line of vision. The FIG. 11 is a view vertical to the plane of the document 10 and FIG. 12 is a view at an angle of about 75° to the plane of the document 10 showing the relative displacement of the two series of image lines upon a positional change of said screen. The lenticular viewing screen in the form of a document 10 can have magnetic fibers imbedded therein and be employed as the previous documents in the practice of the invention. In addition, however, due to the two series of image lines, it can be viewed at a randomly selected angle along a predetermined track by an optical sensor to give a random pulse production which can likewise be coordinated with timing pulses as discussed above.

The process of the invention can also be used to verify the authenticity of objects of art such as paintings by spraying the surface with a clear laquer containing magnetized particles which form a random imperfection capable of being measured in a predetermined track. The binary code produced can be stored and later compared for verification.

Similarly, the person's hand can be sprayed with a clear laquer having particles, therein such as magnetic particles, capable of being measured. A random deposit occurs which can be read along a predetermined track and the binary code stored. Thereafter, the person can be authenticated at a latter date by comparison with the stored binary code.

The preceeding specific embodiments are illustrative of the practice of the invention. It is to be understood, however, that other expedients known to those skilled in the art, or disclosed herein, may be employed without departing from the spirit of the invention or the scope of the appended claims.

We claim:

1. A system for verifying the authenticity safe against forgery of a document by comparison of binary output signals therefrom with binary output signals previously stored, said system comprising:
   (1) a document having randomly dispersed fibers of a magnetic or magnetizable material embedded within at least part of the base material of said document in order to give said documents an imperfection pattern individual thereto, said fibers having magnetic properties different from said base material,
   (2) means for detecting said fibers in a predetermined measuring track over the surface of said document,
   (3) means to convert said detected random fibers into an asymetric analogous pulse train,
   (4) discriminator means for separating such pulses from said pulse train which have amplitudes exceeding a predetermined threshold value from pulses having smaller amplitudes than said level,
   (5) a converter for converting said first-mentioned pulses to a series of detected pulses,
   (6) means for producing a measuring start and stop signal defining the active scanning time period,
   (7) a timing means supplying timing pulses, said timing means being indicia on the surface of said document, and
   (8) means to coordinate said series of detected pulses and said timing pulses to produce a series of binary output signals, whereby a comparison will develop the indentity of said document.

2. The system of claim 1, wherein said means for producing a measuring start and stop signal is a monostable flip-flop arranged to activate a first input of an AND gate, said converter is arranged to supply said series of detected pulses to a second input of said AND gate, said timing means is an oscillator arranged to supply timing pulses having a fixed repetition frequency to a third input of said AND gate, and wherein said gate is arranged to supply said coordinated pulses to a shift register upon coincidence of its three inputs.

3. The system of claim 1, comprising a monostable flip-flop arranged to supply said measuring start and stop signal to a first input of a first AND gate, means arranged to supply said timing pulses to a second input of said first AND gate, said first AND gate being arranged upon coincidence of its two inputs, to supply shift pulses to a shift register and timing pulses to a first input of a second AND gate, means for supplying said series of detected pulses to a second input of said second AND gate, and wherein said second AND gate is arranged, upon coincidence of its two inputs, to supply said series of coordinated pulses to said shift register.

4. A method of verifying the authenticity of documents having a base material provided with randomly dispersed fibers of a magnetic or magnetizable material embedded within at least part of said material in order to give each document an imperfection pattern individual thereto and said imperfections having magnetic properties different from said base material, said method comprising the steps of:
   (a) scanning at least one predetermined measuring track over the surface of said document with a scanner capable of measuring said magnetic properties to produce an asymmetric analogous pulse train representative of the number, distribution and magnetic properties of the fibers present in said track,
   (b) separating such pulses from said pulse train which have amplitudes exceeding a predetermined threshold value from pulses having smaller amplitudes than said value,
   (c) converting said first-mentioned pulses to a series of detected pulses having equal amplitudes but unequal pulse lengths proportional to the energy contents of each corresponding first-mentioned pulse,
   (d) producing a measuring signal defining the scanning time period,
   (e) producing a timing pulse train having a fixed pulse repetition frequency, said timing pulse train being supplied by indicia on the surface of said document,
   (f) coordinating said timing pulse train with said series of detected pulses during said scanning time period to produce a series of binary output signals comprising one pulse for each time coincidence of a timing pulse with at least part of a detected pulse, and
   (g) comparing said binary output signals with a binary output signal previously registered by means of steps (a) to (f) for the actual document to be verified and stored in a central computer.

5. The method of claim 4, wherein the number of measurable fibers of a magnetic or magnetizable material in said track are at least twenty.

6. The method of claim 4 wherein, for the registration of said previously registered binary output signal, said document is scanned repeatedly along at least one track and wherein from scanning to scanning mutually opposite binary output signals are obtained in at least one of the code positions, the step of registering for such at least one code position an individual indication to disregard values obtained for this position during future comparisons of said previously registered output signal with said binary output signal obtained from said document being subject to scanning.

* * * * *